Sept. 30, 1952 W. T. REA 2,612,561

HALF-DUPLEX TELEGRAPH REPEATER

Filed Oct. 25, 1949 2 SHEETS—SHEET 1

INVENTOR
W. T. REA
BY John E. Cassidy
ATTORNEY

Sept. 30, 1952 W. T. REA 2,612,561

HALF-DUPLEX TELEGRAPH REPEATER

Filed Oct. 25, 1949 2 SHEETS—SHEET 2

INVENTOR
W. T. REA
BY John E. Cassidy
ATTORNEY

Patented Sept. 30, 1952 2,612,561

UNITED STATES PATENT OFFICE 2,612,561

HALF-DUPLEX TELEGRAPH REPEATER

Wilton T. Rea, Manhasset, N. Y., assignor to Bell Telephone Laboratories, Incorporated, New York, N. Y., a corporation of New York Application October 25, 1949, Serial No. 123,365

7 Claims. (Cl. 178—73)

Figure 1:
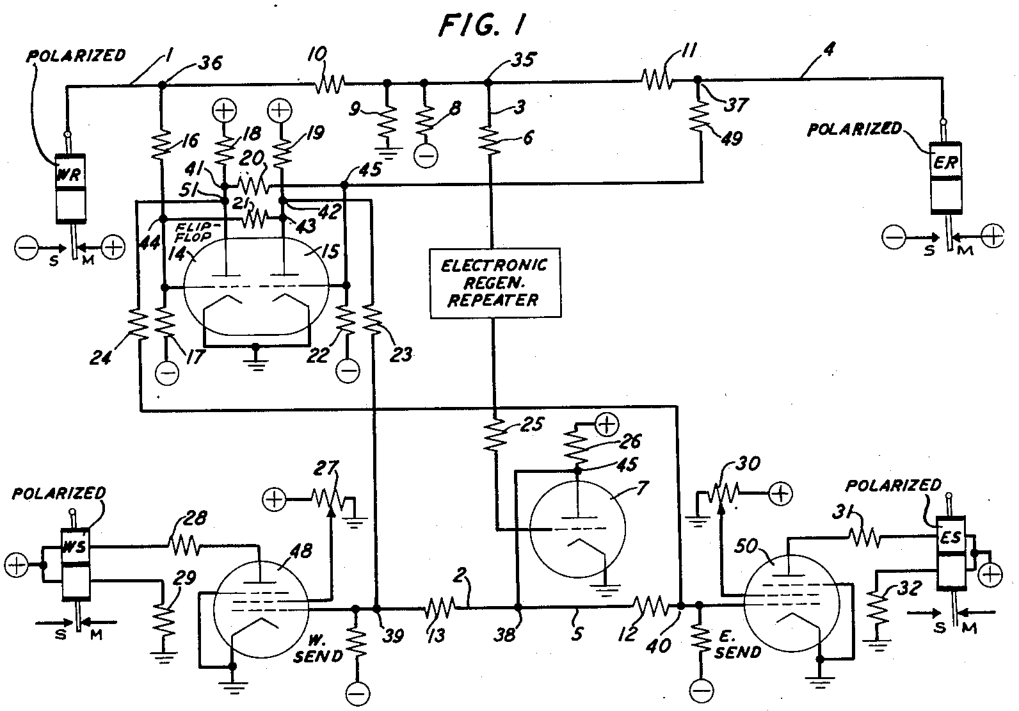

This invention relates to an improvement in telegraph repeater systems and more particularly to a telegraph repeater system in which a one-way regenerative repeater is arranged to serve for two-way half-duplex service.

An object of the invention is the improvement of telegraph repeater systems.

A feature of the invention is an arrangement whereby two telegraph repeaters employed in half-duplex service may be interconnected in such a manner that only a single regenerative repeater in common is required to serve for both directions of transmission instead of an individual regenerative repeater for each direction.

The invention may be understood from the following description when read with reference to the accompanying drawings in which preferred embodiments of the invention are presently incorporated. It is to be understood, however, that the invention may be incorporated in other embodiments which will be readily suggested to those skilled in the art by the present disclosure.

Figure 2:
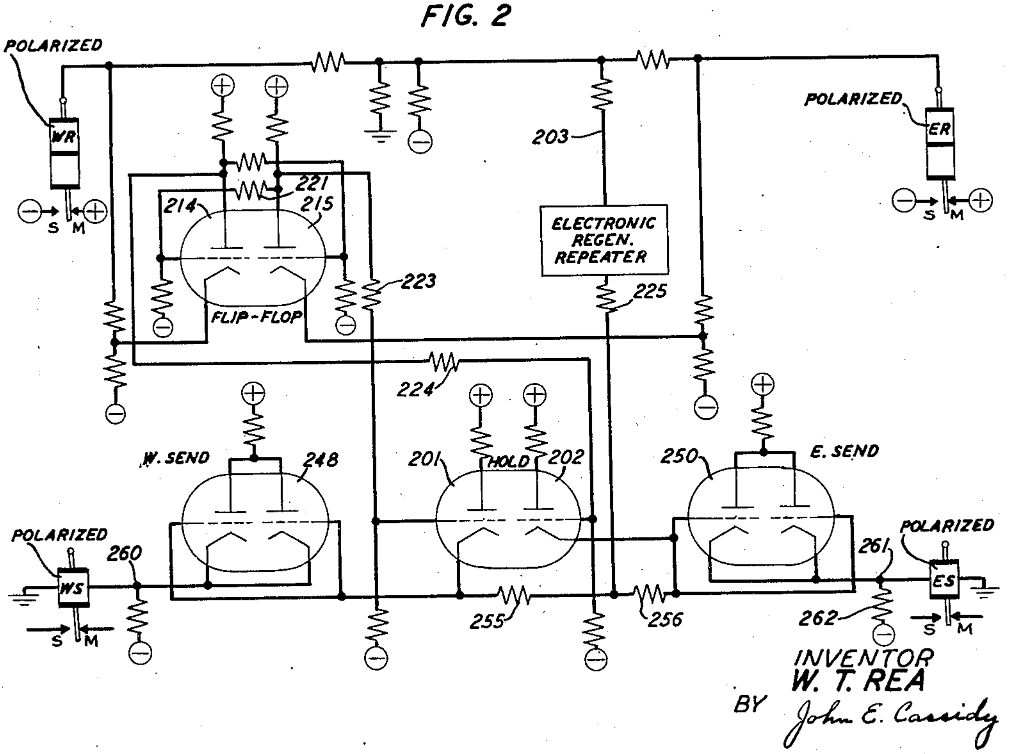
Figure 3:
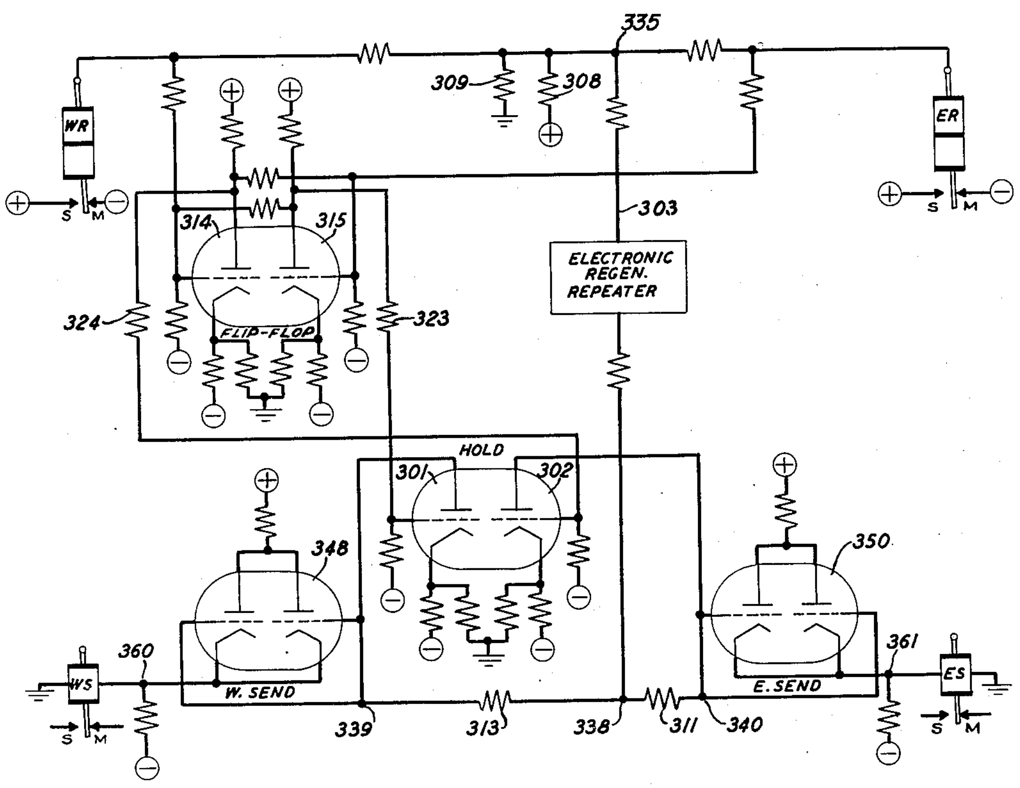

In the drawings:

Fig. 1 shows a system having two telegraph repeaters each having an individual receiving leg and an individual sending leg, which legs are interconnected through what corresponds to a common hub in the usual hub telegraph repeater concentration, and in which system a single regenerative repeater in common serves the two directions; and Figs. 2 and 3 show other embodiments of the invention.

Refer now to Fig. 1 which shows a first, or west, telegraph repeater at the left, connected to a second, or east, telegraph repeater at the right through a hub or common branch, which corresponds to the hub of a typical hub repeater concentration, in the middle of the figure. The west repeater has a west receiving relay WR and a west sending relay WS connected by means of a receiving leg 1 and a sending leg 2 respectively to the common branch 3. The east repeater has an east receiving relay ER and an east sending relay ES connected by means of a receiving leg 4 and a sending leg 5 respectively to the common branch 3. The common branch 3 includes an electronic regenerative repeater, well known in the art, which receives attenuated, distorted signals and regenerates, or retimes and reshapes them and retransmits them. The sensing of the signals, that is, the determination of whether they be marking or spacing, is delayed until the middle portion of each element is being received, before they are regenerated and retransmitted, which results in a delay of approximately one-half the duration of each signal element between reception and retransmission, as well understood in the art. The regenerated signals pass through resistance 25 in the common branch and are impressed on the grid of vacuum tube triode 7, the cathode of which is connected to ground. The hub or common branch may be considered as separable into a receiving hub and a sending hub. The receiving hub comprises the connections between junction 35 and the electronic regenerative repeater. The sending hub comprises the connections between the electronic regenerative repeater and junction 38.

A potentiometer corresponding to a hub potentiometer, consisting of resistance elements 8 and 9 connected between negative battery and ground, has its mid-terminal connected to the junction 35 of receiving legs 1 and 4 and common branch 3.

For the marking condition the armatures of the four relays WR, ER, WS and ES are all in engagement with their right-hand or marking contacts, as shown. The armatures of the receiving relays WR and ER are both actuated to engage their marking contacts due to the net magnetic effect of the current in their windings, not shown, as well understood in the art. With the armature of relay WR on its marking contact, a circuit may be traced from positive battery through its marking contact and armature, receiving leg 1 and resistance 10 to the junction 35. Similarly with the armature of relay ER in engagement with its marking contact, a circuit may be traced from positive battery through the marking contact and armature of relay ER, receiving leg 4 and resistance 11 to junction 35. Under this condition junction 35 and common branch 3 are at positive potential and triode 7 conducts. The positive anode supply potential of triode 7 applied through resistance 26 to the anode is reduced for the conducting condition of triode 7 and the reduced potential is applied through the branch connnecting junctions 45 and 38 between the sending legs 2 and 5 and through resistances 13 and 12 respectively to the grids of the west sending pentode 48 and the east sending pentode 50 respectively. When the armature of either relay WR or ER is actuated to engage its left-hand or spacing contact a negative potential is applied through the respective sending leg to junction 35 which goes negative. The negative potential applied through the common branch 3 cuts off triode 7 which in turn raises the positive potential applied to junction 38 and to the grids of pentodes 48 and 50.

It will be assumed that relay WR transmits a spacing signal toward the common branch 3. A circuit may then be traced from negative battery through the spacing contact and armature of relay WR, junction 36 and resistances 16 and 17 to negative battery. The grid of the left-hand triode 14 of the double or flip-flop triodes 14 and 15 is connected to the junction between resistances 16 and 17. For this condition triode 14 cuts off. A circuit may be traced from the positive anode supply battery through resistance 18 to the anode of triode 14 and from junction 41 through resistances 20 and 22 to negative battery. It is assumed for this condition that the east receiving relay ER does not attempt to transmit a spacing signal simultaneously, which would result in an abnormal condition to be discussed hereinafter. The armature of relay ER remains in engagement with its marking contact as shown, therefore, and a circuit may be traced from positive battery through the marking contact and armature of relay ER, leg 4, terminal 37 and resistances 49 and 22 to negative battery. The grid of triode 15 is connected to the junction of resistances 20, 49 and 22. With triode 14 cut off, the potential of junction 41 and the grid of triode 15 are raised and triode 15 conducts. A circuit may also be traced from positive anode supply battery through resistances 19 and 23 to junction 39 in sending leg 2. With triode 15 conducting, the potentials of its anode and of junctions 42 and 39 are lowered. Notwithstanding the raised potential of junction 38, due to the inactivation of triode 7, as explained, the lowered potential applied to junction 39 and the grid of pentode 48 is dominant and pentode 48 remains cut off. A positive potential is applied to the screen grids of each of pentodes 48 and 50 through the variable potentiometers 27 and 30 respectively to fix their output, when activated, at a predetermined value so that the signals generated by the sending relays are unbiased.

With triode 48 cut off, no current flows in a circuit which may be traced from positive battery through the top winding of relay WS, resistance 28, and from the anode to the grounded cathode of pentode 48. The armature of relay WS is under the influence of its biasing winding only in a circuit from positive battery through the biasing winding and resistance 29 to ground, the effect of which urges the armature of relay WS to engage its right-hand or marking contact as shown.

A circuit may also be traced from junction 51 in the anode circuit of triode 14 through resistance 24 to junction 40 and the grid of pentode 50. With triode 14 cut off the potential of the grid of pentode 50 is raised and since triode 7 is cut off and the potential of terminal 38 is also at its higher value, pentode 50 conducts. A circuit may be traced from positive battery through the top winding of relay ES, resistance 31 and from the anode to the cathode of pentode 50. The effect of current in this path through the top winding of relay ES tends to actuate its armature to engage its spacing contact and this effect is dominant over the opposite effect of the current flowing from positive battery through the bottom or biasing winding of relay ES and resistance 32 to ground tending to maintain the armature of relay ES on its marking contact and the armature of relay ES will be actuated to engage its spacing contact to transmit a spacing signal to the distant connected station.

When the armature of relay WR is again actuated to engage its marking contact, positive battery will be impressed through junction 36 and resistance 16 on the grid of triode 14. This will be ineffective to activate triode 14, however, since, for this condition, with triode 15 activated, a dominant more negative potential is impressed from junction 43, at the anode of triode 15, through resistance 21 on the grid of triode 14, which triode remains cut off during the entire interval while relay WR continues to transmit toward the common branch 3 and until relay ER later may start to transmit toward the common branch. Each marking signal transmitted from relay WR will activate triode 7 and the reduced potential of junction 38 will be controlling in its effect on pentode 50 notwithstanding the potentials of junctions 51 and 40 are at their higher value as triode 14 is cut off, so that pentode 50 will be inactivated for each marking signal element and the armature of sending relay ES will be restored to its marking contact.

So in response to spacing and marking signal elements transmitted from the armature of relay WR, the armature of relay WS will be maintained on its marking contact, while the armature of relay ES will be actuated between its spacing and marking contacts.

If now the armature of relay ER is actuated to spacing while the armature of relay WR is on its marking contact, the negative spacing potential applied through the spacing contact and armature of relay ER, junction 37, resistance 49 and junction 45 on the grid of triode 15 will be of sufficient magnitude to swing the grid negative notwithstanding the positive potential impressed from the anode of inactivated triode 14 at junction 41 through resistance 20 and junction 45 on the grid of triode 15 and triode 15 will be inactivated. A raised positive potential will be impressed through resistance 23 on junction 39. Triode 7 will be cut off for the spacing condition. The potential of junction 38 will be raised. Pentode 48 will conduct and relay WS will transmit a spacing signal to the distant repeater. Simultaneously a raised positive potential will be applied through resistance 21 on the grid of triode 14 which together with the positive potential applied from the marking contact of relay WR through resistance 16 on the grid of triode 14 will activate triode 14, lowering the potential of junction 51 which is applied through resistance 24 on junction 40 and the grid of pentode 50. This will cut off pentode 50. The armature of relay ES will therefore be maintained in the marking condition and it will thus be prevented from retransmitting the spacing signal received from the east repeater back to the east repeater while the spacing signal is propagated to the west repeater.

If the armature of relay WR is in engagement with its spacing contact in response to the reception of a spacing signal from the distant west repeater and simultaneously the distant east repeater transmits a spacing signal to relay ER, the armatures of both the WR and ER relays will impress negative battery on their respective receiving legs and common branch 3 to cut off triode 7 and raise the potential of junction 38. Negative potential will be impressed also through resistances 16 and 49 on the grids of triodes 14 and 15, respectively, both of which will therefore be inactivated. As a result of this a raised positive potential will be impressed from the anodes of triodes 14 and 15 through resistances 24 and 23 respectively on the grids of pentodes 50 and 48 respectively each of which will be activated, in turn energizing the top windings of relays WS and ES, and actuating the armature of each to spacing to propagate a spacing signal to each distant connected repeater as an indication of the abnormal condition. In response to this both distant stations should stop sending and then one or the other may resume, depending upon whether the second space was intended as a break or was an inadvertency.

Refer now to Fig. 2 which is quite similar to Fig. 1 except for the omission of the triode 7 and the addition of a double triode hold tube 201, 202 and other minor changes.

The system per Fig. 2 is shown in the marking condition. It will be assumed that the relay WR transmits a spacing signal toward the common branch 203. Under this condition the cathode of triode 214 is made sufficiently negative that triode 214 is activated. The anode of triode 214 is connected to the grid of triode 215 and when triode 214 is activated triode 215 is cut off. A raised positive potential is therefore impressed through resistance 223 on the grid of hold triode 201. The negative spacing potential is impressed through the west receiving leg, common branch 203, the electronic regenerative repeater, resistance 225 and resistances 255 and 256 in parallel on the cathodes of triodes 201 and 202 respectively. A reduced potential is applied from the anode of triode 214 through resistance 224 on the grid of triode 202. Triode 201 is activated and triode 202 is inactivated. The negative spacing potential of the cathode of triode 201 due to the spacing condition of the common branch 203 is made more positive as a result of the conduction of triode 201 and double sending triode 248 conducts. This makes the potential of junction 260 positive and the polarized sending relay WS is maintained in engagement with its marking contact by the effect of current flowing from positive potential at junction 260 through the winding of relay WS to ground. So the spacing signal generated by relay WR is not transmitted from relay WS.

Since triode 202 is inactivated no current can flow from its plate to its cathode. The negative potential applied by the regenerative repeater through resistances 225 and 256 on the grids of double sending triode 250, the cathodes of which are at a less negative potential, inactivates double triode 250 and negative potential is impressed through resistance 262 and the winding of polar sending relay ES activating its armature to spacing. When the armature of relay WR reengages its marking contact a positive holding potential will continue to be applied from the anode of inactivated triode 215 through resistance 221 to maintain triode 215 activated, so relay WS will continue to be held on marking while relay WR continues to transmit toward common branch 203. Triode 202 is maintained inactivated but the positive marking potential applied through branch 203 and resistance 256 on the grid of double triode 250 activates the triode to restore the armature of sending relay ES to marking.

The operation of the system for the transmission of a spacing signal from relay ER corresponds to that described for the transmission of a spacing signal from relay WR.

If both relays WR and ER attempt to transmit a spacing signal at the same time, triodes 214 and 215 will both be activated, in turn cutting off each of hold triodes 201 and 202 and the double triode send tubes 248 and 250 will both be inactivated by the regenerative repeater, thus effecting the transmission of a spacing signal from each of relays WS and ES to inform of the abnormal condition.

Refer now to Fig. 3 which resembles Fig. 2 except for minor differences. In Fig. 3 the potentiometer, resembling a hub potentiometer, formed of resistances 308 and 309 interconnected between positive battery and ground, applies positive battery to junction 335 and common branch 303. Relays WR and ER for the marking condition, as shown, impress negative battery through their respective sending legs on junction 335 and common branch 303 which for the marking condition is negative. This negative potential is impressed through resistances 311 and 313 on the two grids of each of the west sending double triode 348 and on the east sending double triode 350, respectively, the two cathodes of each of which are at a low negative potential. Starting with the marking condition, if either relay WR or ER is actuated to spacing, positive potential is applied through the corresponding leg and junction 335 and common branch 303 which tends to change the potential applied to the grids of each of triodes 348 and 350 to positive.

It will be assumed that relay WR is actuated to spacing. This makes the grid of triode 314 of the flip-flop triodes 314 and 315 more positive and triode 314 is activated while triode 315 is cut off. A reduced potential is applied through resistance 324 on the grid of triode 302 and a raised potential is applied through resistance 323 on the grid of triode 301. Triode 302 cuts off and triode 301 conducts. A raised potential is applied by the regenerative repeater on the grids of double triode 350 which conducts. A lowered potential is applied from the plate of triode 301 on the grids of double triode 348, which remains cut off. Junction 361 becomes positive and relay ES is actuated to spacing. Junction 360 remains negative maintaining relay WS in the marking condition.

When relay WR is restored to the marking condition, triode 314 in the flip-flop circuit remains activated and triode 315 remains cut off so that the potential conditions applied to the grids of triodes 348 and 350 by the hold triodes remain unchanged. The common branch 303 goes negative in response to a marking signal and this voltage applied also to the grids of double triode 350 is dominant so that double triode 350 cuts off and the armature of relay ES is restored to marking. Since a lowered potential is applied to the grids of double triode 348 both from the common branch and from the hold triode 301, double triode 348 remains cut off and relay WS is maintained on its marking contact.

So relay ES follows the marking and spacing signals transmitted from relay WR and relay WS is maintained in the marking condition. When communication signals are transmitted from relay ER, relay WS follows the signals and relay ES is maintained on marking in a manner which should be apparent from the foregoing.

If both relays WR and ER transmit spacing signals simultaneously both flip-flop triodes 314 and 315 conduct. Both hold triodes 301 and 302 are cut off. The positive potential supplied from the output of the regenerative repeater is effective on the grids of both the send tubes 348 and 350. Send tubes 348 and 350 conduct and a positive potential impressed on junctions 360 and 361 actuates relays WS and ES respectively to spacing to transmit a spacing signal from each as an indication of the abnormal condition.

What is claimed is:

1. In a half-duplex direct-current telegraph repeater system, a first telegraph repeater, a second telegraph repeater, a receiving leg and a sending leg in each of said repeaters, a common branch, a regenerative repeater in said branch, said legs connected to said branch, a first operable telegraph communication signaling path, extending through said receiving leg in said first repeater, through said common branch and through said sending leg in said second repeater establishable at a first time, a second operable telegraph communication signaling path extending through said receiving leg in said second repeater through said common branch and through said sending leg in said first repeater establishable at a second time, a circuit common to said first and to said second repeaters, said control circuit including space discharge devices for blocking said sending leg of said first repeater and said sending leg of said second repeater at said first and said second times respectively, said space discharge devices comprising a flip-flop circuit, said circuit having an individual input connection to each of said receiving legs and an individual output connection to each of said sending legs.

2. In a half-duplex telegraph repeater system, a first telegraph repeater having a receiving leg and a sending leg connected to a common hub, a second telegraph repeater having a receiving leg and a sending leg connected to said hub, and a control circuit serving said two repeaters in common, to control communication from the receiving leg of either repeater through said hub and through the sending leg of the other repeater, individual lumped impedances in each of said sending legs, each of said impedances having a first terminal connected individually to said hub, and an individual communication direction regulating conductor for each of said sending legs extending from a second terminal of said resistance in each respective leg to said common control circuit.

3. In a half-duplex direct-current hub telegraph repeater system, a hub, a first and a second telegraph repeater, each of said repeaters having a receiving relay connected through a receiving leg to said hub and a sending relay connected through a sending leg to said hub, a communication signal direction control circuit, said control circuit common to both of said repeaters for controlling transmission from one to another of said repeaters, a first and a second space discharge device in said control circuit, a connection from said receiving leg of said first repeater to the input of said first device, a connection from said receiving leg of said second repeater to the input of said second device, interconnections between said two devices for activating or deactivating one in response to the activation or deactivation of the other, individual connections from each of said devices to respective ones of said sending legs and an individual lumped impedance in each said sending leg between said individual connections and said hub.

4. In a direct-current half-duplex telegraph system, a first telegraph receiver, a first telegraph transmitter, a second telegraph receiver, a second telegraph transmitter, a receiving hub, a sending hub, an individual telegraph leg connecting each of said receivers to said receiving hub, an individual telegraph leg connecting each of said transmitters to said sending hub, a regenerative repeater interconnecting said hubs, a control circuit for controlling the direction of transmission of communication signals between said telegraph receivers and transmitters, said control circuit common to said first and said second transmitters and receivers, said control circuit including two space discharge devices interconnected to form a flip-flop circuit, an individual circuit connecting the input circuit of each of said discharge devices to a respective one of said legs connecting said receivers to said receiving hub, an individual output circuit connecting the output circuit of each of said discharge devices to a respective one of said legs connecting said transmitters to said sending hub, an individual lumped impedance in each of said transmitting legs, said impedances each having a respective terminal connected to said sending hub, an individual space discharge device in each said transmitting leg, each of said output circuits connected individually intermediate said lumped impedance and said space discharge device in its respective transmitting leg.

5. A system in accordance with claim 4 including a space discharge device in said sending hub, said device having an input connected to the output of said regenerative repeater and an output constituting a portion of said sending hub.

6. In a hub-type telegraph repeater concentration, two individual hub-type repeaters interconnected through individual receiving legs and individual sending legs to a hub, a control circuit common to said two repeaters for controlling transmission between said two repeaters, said control circuit having two space discharge devices interconnected to form a flip-flop circuit, an input of each device connected individually to said individual receiving legs, a first and a second hold discharge device, each of said hold devices having an input connected to the output of an individual one of said flip-flop devices, each of said hold devices having an output connected to an individual sending leg and a lumped impedance in each said sending leg intermediate said output connection to its respective hold device and said hub.

7. In a half-duplex direct-current telegraph repeater system, a first telegraph repeater, a second telegraph repeater, a receiving leg and a sending leg in each of said repeaters, a common branch, a regenerative repeater in said branch, said legs connected to said branch, a first operable telegraph path extending from said receiving leg in said first repeater through said common branch and through said sending leg in said second repeater establishable at a first time, a second operable telegraph path extending from said receiving leg in said second repeater through said common branch and through said sending leg in said first repeater establishable at a second time, a control circuit common to said two repeaters, said control circuit including space discharge devices and a first resistance network potentiometer having first potential connections thereto for blocking said sending leg of said first repeater and said sending leg of said second repeater at said first and said second times respectively for normal communication, said control circuit including also second potential connections to said potentiometer for unblocking both of said sending legs simultaneously in response to an abnormal condition.

WILTON T. REA.

REFERENCES CITED

The following references are of record in the file of this patent:

UNITED STATES PATENTS

| Number | Name | Date |
|---|---|---|
| 2,337,886 | Hanley | Dec. 28, 1943 |